United States Patent [19]

Forman et al.

[11] 3,984,882
[45] Oct. 12, 1976

[54] PANEL STRUCTURE FOR USE ON WATER BODIES

[75] Inventors: Christopher S. Forman, Arcadia; Richard K. Gerlach, Rolling Hills Estates, both of Calif.

[73] Assignee: CaTel Manufacturing Inc., Monrovia, Calif.

[22] Filed: Aug. 25, 1975

[21] Appl. No.: 607,446

[52] U.S. Cl. .................................. 4/172; 4/172.11; 4/172.12; 126/270; 126/271
[51] Int. Cl.² .......................... E04H 3/16; E04H 3/18
[58] Field of Search .............. 4/172, 172.19, 172.12, 4/172.13, 172.14; 126/270, 271

[56] References Cited
UNITED STATES PATENTS

| 895,761 | 8/1908 | Huntoon | 4/172 X |
|---|---|---|---|
| 2,580,555 | 1/1952 | Kroeger | 4/172.14 |
| 3,072,920 | 1/1963 | Yellott | 4/172.12 |
| 3,411,163 | 11/1968 | Myers, Jr. | 126/271 X |
| 3,466,119 | 9/1969 | Francia | 126/270 X |
| 3,620,206 | 11/1971 | Harris, Jr. et al. | 126/271 |
| 3,893,443 | 7/1975 | Smith | 126/271 |

FOREIGN PATENTS OR APPLICATIONS 13,780   6/1928   Australia.......................... 4/172.12

OTHER PUBLICATIONS

Solar Heating For Swimming Pools, An Interim Report by S. R. Robson, B.E., New Zealand Engineering, pp. 298–299, Sept. 1956.

Primary Examiner—Henry K. Artis
Attorney, Agent, or Firm—William W. Haefliger

[57] ABSTRACT

A solar panel unit comprises:
a. a loop-shaped plastic frame, bounding an open zone, the frame having a channel section,
b. a plastic sheet extending across the open zone, and
c. insert means retained in the channel section and holding the sheet to the frame,
d. the sheet having woven construction and defining air filled interstices distributed over the sheet area across the open zone.

13 Claims, 8 Drawing Figures

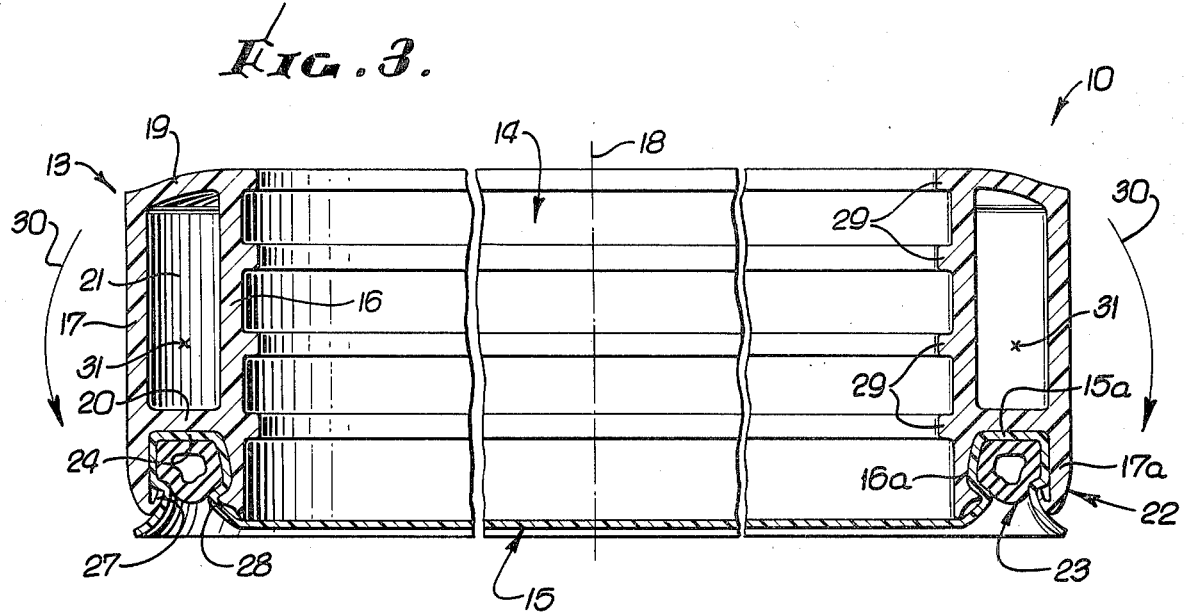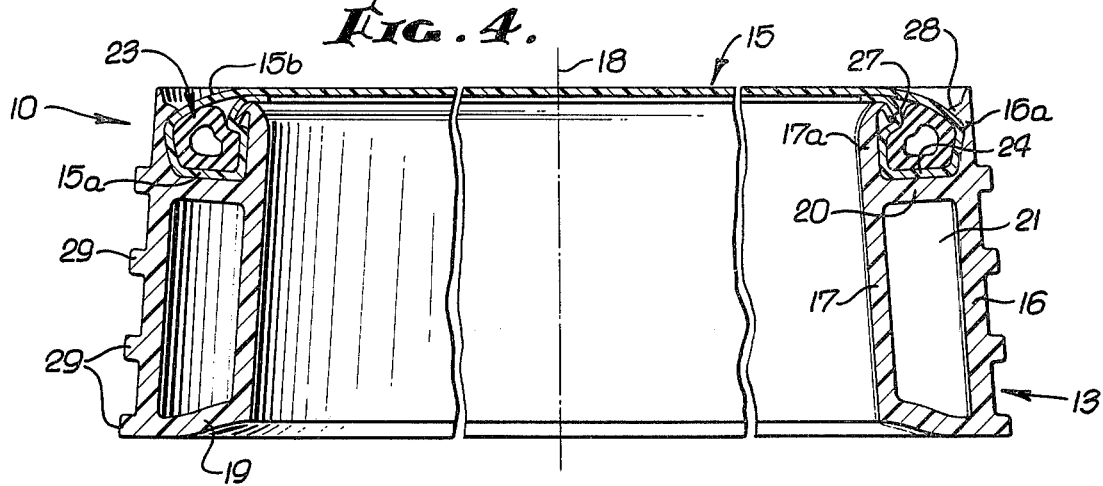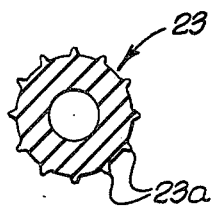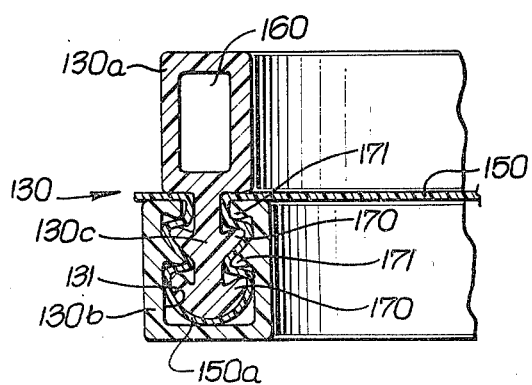

PANEL STRUCTURE FOR USE ON WATER BODIES

BACKGROUND OF THE INVENTION

This invention relates generally to apparatus for retaining heat in and transferring solar energy to bodies of water, and more particularly concerns solar panel units adapted to float and receive solar radiation for transferring heat to water therebeneath, and also to block evaporation of water which would otherwise carry heat to the atmosphere.

Devices of the type with which the invention is concerned have been previously disclosed in U.S. Pat. application Ser. No. 534,368 entitled, "Solar Panel". The present invention concerns improvements in such devices having to do with altering their heat transfer capability; enhancing their floating dynamics with regard to winds; ensuring structural integrity of such panels; and adapting them to rapid assembly, and ease of shipment.

SUMMARY OF THE INVENTION

It is a major object of the invention to provide an improved solar panel unit embodying unusual advantages in construction and operation as referred to above and also as will be described herein. Basically, the unit comprises:

a. a loop-shaped plastic frame, bounding an open zone, the frame having a channel section,
b. a plastic sheet extending across the open zone, and
c. insert means retained in the channel section and holding the sheet to the frame,
d. the sheet having woven construction and defining air filled interstices distributed over the sheet area across the open zone.

As will appear, the sheet may typically include a colored plastic filler applied to the woven construction, the filler defining the air-filled interstices and being exposed at upper and lower sides of the sheet; and the filler may be dark colored at one side of the sheet to absorb light and produce heat, and light colored at the opposite side of the sheet to reflect heat from the water body when the solar panel is inverted. The importance of this feature will be explained below. Further, the frame may be toroidally twisted about 180° to tension the sheet edge portions back over the insert means so as to retain same in the frame channel section preventing inadvertent pull-out of the sheet from the frame; and the insert means may comprise an elongated flexible bead constructed to interact with the channel section to firmly and positively retain the sheet edge portion in the frame. For example, interference shoulders may be provided to engage and retain the sheet. Finally, the frame may include interfitting portions that cooperate to retain the sheet in position, and the panel units may be constructed to nest and stack for ease of shipment, the units having different diameters for this purpose.

These and other objects and advantages of the invention, as well as the details of illustrative embodiments, will be more fully understood from the following description and drawings, in which:

DRAWING DESCRIPTION

FIG. 3 is an enlarged section through a solar panel frame and cover;

FIG. 4 is like FIG. 3 but showing the frame and cover assembly after toroidal twisting of the frame about 180°;

FIG. 5 is an enlarged section taken through an insert bead;

FIG. 6 is a vertical section taken through a modified solar panel;

DETAILED DESCRIPTION

Figure 1:
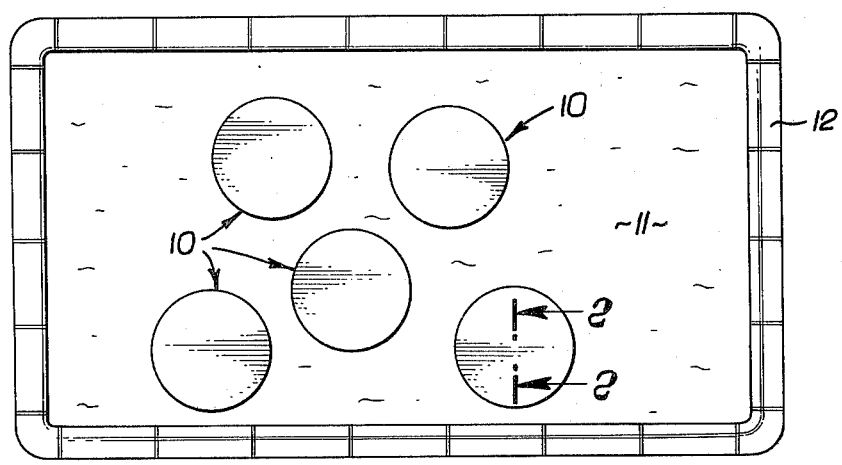
FIG. 1 is a plan view of a swimming pool in which solar panels are deployed.

Referring first to FIG. 1, panel units 10 are shown deployed on the surface of a body of water 11 such as is contained by swimming pool structure 12. The floating units 10 are generally circular in shape, and function to intercept solar radiation and to transfer solar heat by conduction to the pool water; in addition, they act to prevent heat loss from the pool due to evaporation. Units 10 may have other planar shapes.

Each unit 10 basically comprises a loop-shaped plastic frame, one example being shown at 13 in FIG. 3 and bounding an open zone 14; a plastic sheet 15 extending across zone 14; and insert means retained in a channel section of the frame and holding the sheet to the frame. In the embodiment of FIG. 3, the frame 13 includes radially spaced walls 16 and 17 which extend generally parallel to the central axis 18 of the unit 10, and axially spaced walls 19 and 20 bridging between walls 16 and 17. Walls 16, 17, 19 and 20 form an enclosed hollow 21 extending about axis 18 so that the frame is buoyant and tends to float on the water body 11. Walls 20 together with annular cantilever extensions 16a and 17a of walls 16 and 17 form a channel section 22 to receive the insert element 23 for holding the sheet 15 to the frame. Element 23 may advantageously comprise an elongated, flexible elastomer or plastic bead sized to tightly fit within the recess 24 defined by the channel shaped section 22 along with an edge portion 15a of the sheet 15, as shown.

The unflexed insert bead may have generally circular cross-section as seen in FIG. 5, and define lengthwise extending surface serrations 23a which project outwardly and which are spaced circularly about the bead cross-section. Accordingly, the serrations cooperate with the sheet edge portion, and with the inner wall surfaces of the section 22, and with the inwardly projecting tongues 27 and 28 integral with and at the free ends of wall extensions 16a and 17a, to tightly hold the sheet to the frame. Note that tongues or lips 27 and 28 are caused to yieldably grip the sheet edge portion 15a, due to the resilient cantilever bending capability of the annular wall extensions 16a and 17a, and the yieldable compressibility of the insert bead or spline 23. The four axially spaced annular ridges 29 integral therewith as shown stiffen the frame.

Following assembly of the sheet 15 to the frame as described, the frame is twisted toroidally by manual or other application of forces as indicated by arrows 30 acting about an annular axis 31 of the frame (i.e. generally about the annular hollow 21), to displace the frame "inside out", i.e. through about 180° of rotation about axis 31. The resultant configuration appears in FIG. 4, with the sheet 15 now tensioned and extending at 15b back over the insert bead in tight overlapping relation therewith proximate the mouth 32 of the recess defined by the arm extensions 16a and 17a. Accordingly, the bead is held in position in the recess, preventing its pull-out, by the sheet 15 which was initially held to the frame by the bead in FIG. 3. Further, the sheet edge portion 15a including extent 15b extends all the way around the bead in FIG. 4. Toroidal twisting presents the four axially spaced annular ridges 29 on wall 16 in an outward direction, so that they may mesh or interdigitate with similar ridges on adjacent floating panels, preventing stacking of the panels in a pool when the wind blows.

Figure 7:
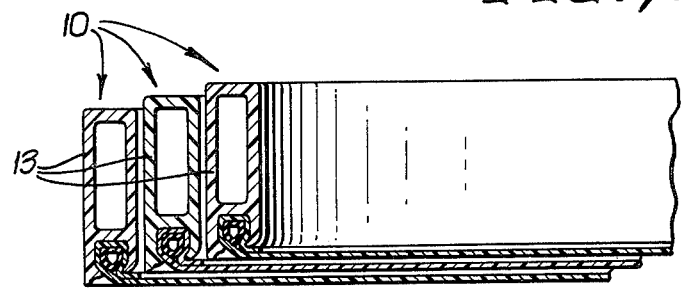
FIG. 7 is a section taken through stacked solar panels of varying diameters.

FIG. 7 shows multiple panels 10 of different diameters nested and stacked, for shipment, with frames 13 extending in side-by-side relation.

Figure 8:
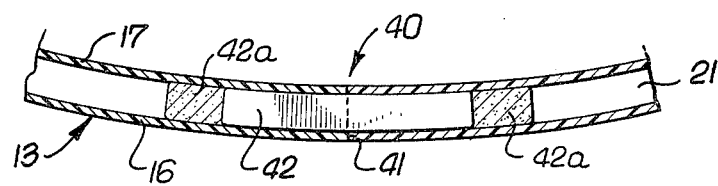
FIG. 8 is a section through the frame at a joint.

FIG. 8 illustrates a typical joint 40 formed by closed together lengthwise ends 41 of the frame extrusion 13. An insert plug 42 may be extended within the hollows 21 to fill the space between walls 16 and 17, the plug being suitably bonded to such walls at opposite sides of the joint to retain the ends 41 in position as shown, whereby the frame form a loop or ring.

FIG. 6 illustrates a modification wherein the molded plastic annular frame 130 includes interfitting portions 130a and 130b, the plastic insert means 130c being defined by one of the portions, i.e. portion 130a. The insert means 130c is shaped as an annular tongue or plug tightly receivable within a recess 131 formed by channel shaped portion 130b of the frame. Edge portion 150a of the plastic sheet 150 is retained to the frame, as by clamping between the insert 130c and the inner walls of the frame portion 130b that define the recess as shown. Portion 130a may be hollow as at 160, for flotation of the panel unit. Note the meshing ridges 170 and 171 on the insert means and on the frame portion 130b acting to retain the sheet 150 therebetween.

Figure 2:
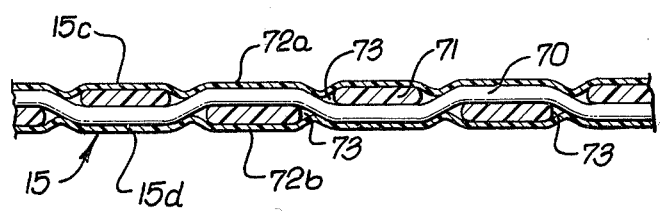
FIG. 2 is an enlarged section taken through a solar panel cover.

In FIG. 2 the sheet 15 is shown to have woven construction, as defined by enlarged warp and woof solid plastic strands 70 and 71. The plastic itself may advantageously consist of polypropylene, polyethylene or other suitable plastic, and the frame preferably consists of ABS plastic material. Further, air-filled interstices or voids are distributed over the sheet, and acting to load with water to increase the weight of the sheet in a pool, thereby diminishing any tendency for the panel to be wind blown up off the water surface. The sheet may include a colored plastic filler such as plastic (similar to that listed above) paint or film applied to the woven construction, to define the upper and lower surfaces 15c and 15d. Such filler is indicated at 72a (upper) and 72b (lower). The filler may define, with strands 70 and 71, the air filled voids or interstices as at 73 and into which water tends to seep via the porosity of the film. The woven construction or strands 70 and 71 may advantageously consist of clear (uncolored or transparent or translucent) polypropylene, whereas upper filler layer 72a may have a dark color (blue for example), and lower filler layer may have a light color (white, for example), all for the purpose of absorbing downward solar radiation at the upper surface 15c to heat the pool during the day or to reflect heat radiation away from the pool when surface 15d, faces the sky to minimize heat transfer to the pool. This condition would exist as in desert areas with very hot daytime sunshine.

The panels 10 are typically between about 4 to 6 feet in cross dimension, i.e. diameter, in the case of circular panels. They may be loop shaped instead of circular, or any other shape.

We claim:

1. In a panel unit to be deployed on a body of water to alter heat transfer to or from the water or to block evaporation,
    a. a loop-shaped plastic frame, bounding an open zone, the frame having a channel section,
    b. a plastic sheet extending across said zone, and
    c. insert means retained in said channel section and holding said sheet to the frame,
    d. said sheet having woven construction and there being air filled interstices distributed over the sheet area across said zone to load with water in response to sheet contact with the water.

2. The panel unit of claim 1 wherein the sheet includes a colored plastic filler applied to said woven construction, said interstices located between said filler and said woven construction.

3. The panel unit of claim 2 wherein said filler is exposed at and over opposite sides of said sheet.

4. The panel unit of claim 3 wherein the filler consists of colored polypropylene, and the woven construction consists of clear polypropylene strands.

5. The panel unit of claim 4 wherein said color is light at one side of the sheet and dark at the opposite side of the sheet.

6. The panel unit of claim 1 wherein the frame extends generally circularly and the sheet edge portion overlaps and retains the insert means in said channel section.

7. The panel unit of claim 1 wherein the insert means comprises a flexible elongated bead retaining the edge portion of the sheet in the channel section.

8. The panel unit of claim 7 wherein the bead has generally circular cross-section and defines lengthwise extending surface serrations spaced circularly about the bead section, the channel section having at least one tongue blocking removal of the bead from the channel section, the edge portion of the sheet compressively retained between the bead and said tongue.

9. The panel unit of claim 8 wherein the edge portion of the sheet is wrapped about the bead in a recess formed by the channel section, and the sheet edge portion extends tightly across the bead at the mouth of the recess.

10. The panel unit of claim 1 wherein the frame includes interfitting portions, the insert means defined by one of said portions.

11. Multiple panel units as defined in claim 1, said units being nested and stacked with said frames extending in side-by-side relation, the frames having different outer diameters.

12. In an integral panel unit to be deployed on a body of water to alter heat transfer to or from the water or to block evaporation, the unit including a loop-shaped plastic frame bounding an open zone, the frame having a channel section, a plastic sheet extending across said zone, and insert means retaining the sheet to the frame, the improvement comprising
    a. the edge portion of the sheet and the insert means received into the channel section thereby to retain the sheet to the frame, and
    b. the frame being toroidally twisted approximately 180° to extend the sheet edge portion back over the insert means in overlapping and retaining relation therewith proximate the mouth of said channel section.

13. The panel unit of claim 12 wherein the frame includes outwardly presented peripheral ridges adapted to mesh with similar ridges on an adjacent panel unit floating on the water body, thereby blocking relative vertical displacement of the panel units at the locus of ridge meshing.

* * * * *